Figure 1:
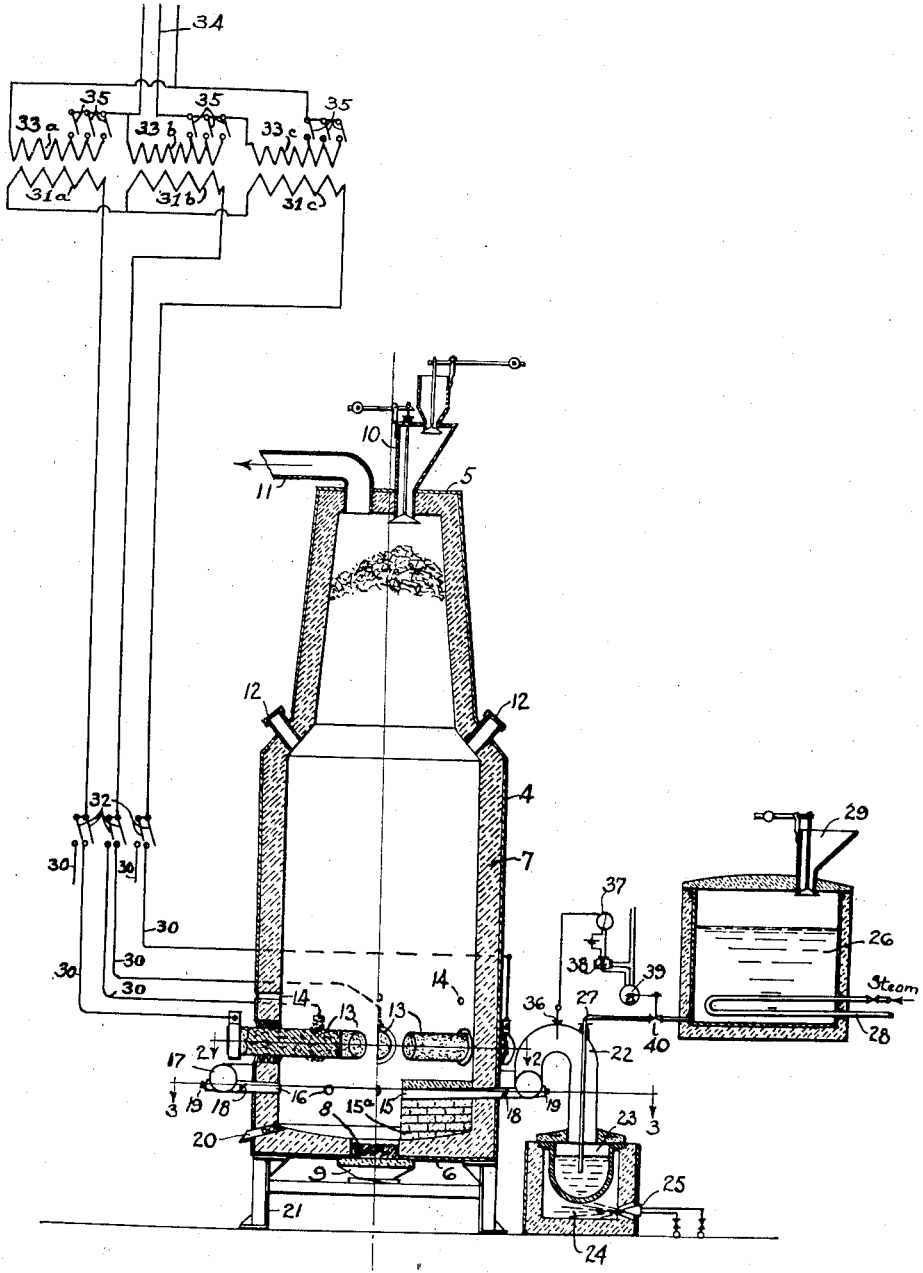

Dec. 27, 1932.　　　C. C. SCHWEGLER　　　1,892,191
APPARATUS FOR THE MANUFACTURE OF CARBON BISULPHIDE
Filed Oct. 9, 1930　　2 Sheets-Sheet 1

INVENTOR
BY Clarence C. Schwegler
Thomas Griswold, Jr.
ATTORNEY

Dec. 27, 1932.  C. C. SCHWEGLER  1,892,191

APPARATUS FOR THE MANUFACTURE OF CARBON BISULPHIDE

Filed Oct. 9, 1930  2 Sheets-Sheet 2

INVENTOR
BY Clarence C. Schwegler
Thomas Griswold Jr.
ATTORNEY

Patented Dec. 27, 1932

1,892,191

UNITED STATES PATENT OFFICE

CLARENCE C. SCHWEGLER, OF MIDLAND, MICHIGAN, ASSIGNOR TO THE DOW CHEMICAL COMPANY, OF MIDLAND, MICHIGAN, A CORPORATION OF MICHIGAN

APPARATUS FOR THE MANUFACTURE OF CARBON BISULPHIDE

Application filed October 9, 1930. Serial No. 487,449.

My invention relates generally to electrothermic processes for the manufacture of carbon bisulphide by the reaction of sulphur vapor upon electrically heated carbon, and has particular regard to improvements in means for the control of the operation.

The general process, as is well known, is carried out by providing a body of carbon material, e. g. charcoal, in a suitable electric furnace commonly of the shaft type, such charcoal surrounding the furnace electrodes and forming a path therebetween to conduct current; heating a portion of the charcoal to a red heat by passing the electric current therethrough; then introducing sulphur into such heat zone wherein reaction between sulphur and carbon takes place; and finally removing and condensing the vapors of carbon bisulphide thereby formed. A relatively large body of charcoal is provided within the furnace, which is first preheated therein and eventually feeds by gravity into the reaction zone, additional material being charged in to replenish that reacted and to maintain about a constant charge thereof in the furnace. In order to improve the conductivity of the charcoal it has been the practice to mix therewith pieces of hard carbon or graphite, such as scrap electrodes, in small amount. The sulphur may be introduced into the furnace either in solid, liquid or vapor form, but for greatest ease of control of the supply thereof it is introduced preferably as vapor.

Owing to local changes in the density and conductivity of the charge in the hot reaction zone as the material therein is consumed and replaced by further supplies, or to other factors, we have found that such reaction zone does not remain in a fixed position between the electrodes, but possesses a considerable degree of mobility, diverging to one side or the other of the direct path between electrodes and also at times rising to a position more or less above the level of the electrodes when the latter are inserted laterally within the furnace. This condition is the more pronounced in furnaces of large capacity wherein several electrodes, i. e. more than two or three, are employed thus providing a plurality of current paths between the electrodes. This tendency of the hot zone to shift away from the central position gives rise to various disturbances in the operation of the furnace. For instance, the sulphur vapor rising through the charge does not all enter the reaction zone but to greater or less extent by-passes it or is diverted away from it to the cooler areas, and hence escapes reaction and passes out of the furnace along with the exit vapors. The tendency, when once the hot zone is displaced from a central location, is for the sulphur vapors more and more to be diverted away from it to the cooler portions of the charge and to act to cool the same still further, while the hot zone becomes hotter and hotter due to an increasing concentration of current flow in a limited area. Thus the unfavorable condition is continually aggravated, giving rise to increasing loss of efficiency and producing an overheated zone which may approach closely enough to the side wall of the furnace at some point to cause serious damage to the same by slagging and by the reducing action of the highly heated carbon.

I have found that the aforesaid tendency of the reaction in the furnace charge to get out of hand and to give rise to the various operating difficulties mentioned may be compensated or counteracted by providing means for distributing the flow of electric current to, and for the introduction of sulphur vapor in, the furnace charge so that either one or both may be selectively varied in intensity or direction, and by so operating the furnace controls that the hot zone is stabilized in an approximately central position, and also, if desired, at a level above that of the electrodes, all in accordance with the improved procedure hereinafter fully described and pointed out in the claims. The annexed drawings and following description set forth a preferred embodiment of my invention which, however, is not intended to be limited thereby except as expressly stated in the terms of the claims.

In the annexed drawings:—

Figure 2:
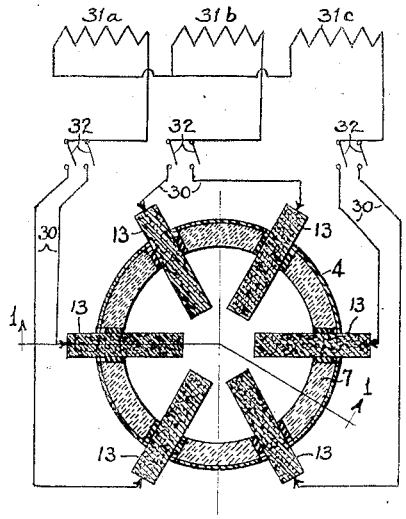
Figure 3:
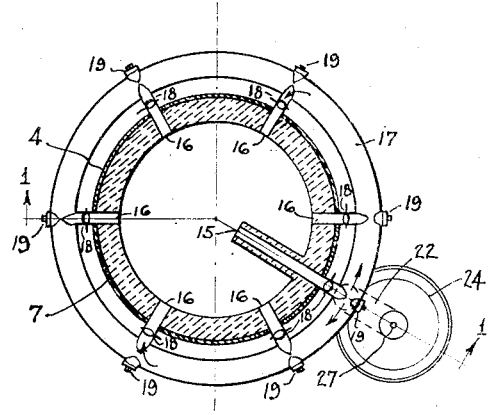
Figure 4:
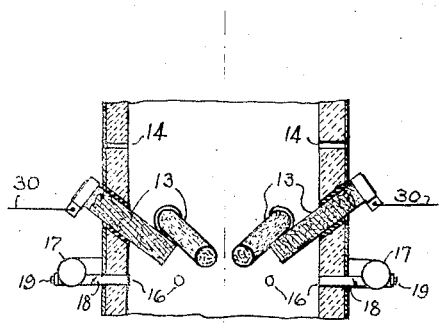
Figure 5:
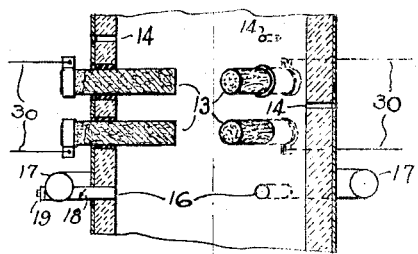

Fig. 1 shows in vertical section on the line 1—1 of Figs. 2 and 3 a form of electric furnace suitable for the process in hand, together with accessory apparatus and with electrical connections. Fig. 2 is a horizontal cross section on the line 2—2 of Fig. 1, and including electrical connections, and Fig. 3 a similar section on the line 3—3 of Fig. 1. Figs. 4 and 5 are partial sectional views of a furnace shaft showing alternative electrode arrangements.

Referring to Fig. 1, furnace casing 4 consists of an upright steel shell, the lower part of which is cylindrical up to a shoulder located somewhat above the middle, and above which the walls converge toward the top in the form of a truncated cone. The casing is closed at either end by top plate 5 and bottom plate 6, and the top, sidewalls and hearth are provided with a refractory lining 7. If desired additional heat insulating material, not shown, may be applied to the outside of the casing. A central clean-out opening 8 is left in the furnace bottom, provided with a cover 9, which is intended for use only during periods of shut-down. When the furnace is prepared for use, opening 8 is filled with sand or other loose refractory material. A closable feeding hopper 10 for charcoal is located at the top and is preferably double-sealed, as shown, for charging charcoal without permitting escape of vapors from the furnace. Exit pipe 11 for reaction products is also located in the top. Charging inlets 12 for conducting carbon are provided in the side walls at the shoulder, preferably one thereof directly above each electrode. Electrodes 13 of hard carbon or graphite are inserted horizontally through the side walls and are radially disposed in a plane elevated a short distance above the furnace bottom, the number thereof preferably being three or a multiple of three so as to be adapted for use with three-phase alternating current. The preferred arrangement consists of six electrodes equally spaced around the periphery of the furnace, as shown in Fig 2. The electrodes are firmly cemented in place by suitable refractory insulating material. A number of sight holes 14 are provided in the furnace wall in the vicinity of the electrodes for observing the progress of the reaction. Sulphur vapor is introduced through a tube or conduit 15 of carbon or refractory material supported upon a pier 15a and opening near the center of the furnace below the electrode zone, and through a plurality of secondary inlets 16 in the furnace wall, each located preferably below an electrode. Inlets 15 and 16 are preferably inclined slightly and are connected to a common bustle pipe or header 17 which surrounds, but is spaced somewhat away from, the external wall of the furnace. Each sulphur vapor pipe is provided with a valve 18, and in header 17 a closable opening 19 is placed opposite to each inlet pipe to give access thereto for cleaning out. A slag spout 20 is located at the bottom of the furnace, and the entire structure is borne by legs or supports 21.

An inverted U pipe 22 leads from header 17 to covered sulphur vaporizing pot 23 which is set in a suitable furnace 24, here shown as heated by oil burner 25. Molten sulphur is introduced into pot 23 from melting tank 26 by means of pipe 27 which preferably is enclosed for a portion of its length within U pipe 22. Tank 26 is heated by steam coil 28, and is suitably covered and heat insulated, sulphur being fed thereto through hopper 29.

Electrodes 13 are connected in pairs by leads 30 to one phase of a three-phase source of alternating current of suitably low voltage, as shown in Fig. 2. In Fig. 1, four only of the electrodes are shown connected to the terminals of secondary coils 31a, 31b and 31c of three transformers, while Fig. 2 shows the complete arrangement in pairs similarly connected. The secondary coils are conveniently star-connected, as shown, but they may be delta-connected, if so desired. Leads 30 are each provided with a switch 32, whereby any one or more of electrodes 13 may be disconnected at will. Primary coils 33a, 33b and 33c of said transformers are connected to a source of three-phase current 34, and are shown delta-connected among themselves. Each primary coil is provided with a plurality of taps or contacts 35 from the lead wire whereby to vary the length of winding in circuit, and hence the voltage induced in the secondary coils, so that the voltage applied to electrodes 13 may be varied accordingly.

In sulphur vapor supply pipe 22 is placed a thermocouple 36 or other temperature measuring device connected to an indicating or recording instrument 37. Contact points on instrument 37 are electrically connected with a low powered source of current, e. g. a drycell, which, when the circuit is closed, operates through a relay 38 to control a switch to start or stop a motor 39, the motor in turn being mechanically connected to actuate valve 40 controlling the supply of molten sulphur. Other means responsive to the temperature indication of instrument 37 may be utilized, however, for controlling the supply of molten sulphur, if desired, the one shown illustrating a convenient arrangement.

In conducting the process the furnace is charged nearly full with charcoal through hopper 10, a small proportion of conducting carbon, e. g. about 1/20 to 1/40 of the charcoal by volume, being added to the charge through inlets 12. Electric current is passed through the charge between the electrodes 13, being introduced advantageously at a voltage between about 40 and 80 volts, until the zone in the vicinity of the electrodes is heated to a red heat, e. g. between about 600° and 800° C., which may be determined by observation through sight holes 14. Then sulphur vapor is admitted through central inlet 15 to react with the red hot carbon. The temperature of the sulphur vapor supplied is held between about 445° and 500° C. as measured by pyrometer 36, the flow of molten sulphur from melting tank 26 to maintain the liquid level in vaporizing pot 23 being automatically controlled by means responsive to the temperature indication, as already explained. So long as regular operation continues the principal supply of sulphur vapor is introduced into the furnace through central inlet 15 and side inlets 16 may be closed. The vapors of carbon bisulphide leaving the reaction zone pass upwardly through the charge and are removed through exit passage 11 to a cooling and condensing apparatus not shown, while additional charcoal and conducting carbon are fed in at 10 and 12, respectively, at intervals as required.

When it is observed, however, that the hot zone is shifting toward one side of the furnace, which is shown when the color of the heated charge viewed through the sight holes becomes bright on one side of the furnace and becomes dull or fades out on the opposite side, sulphur vapor may be admitted on the hot side through one or more of ports 16 by opening corresponding valves 18, while the flow of sulphur vapor through central inlet 15 may be cut down somewhat by adjusting the control valve. Alternatively or in addition to the foregoing procedure one or more of electrodes 13 on the same side may be disconnected by opening corresponding switches 32, so as to direct the current flow between the electrodes on the opposite side of the furnace and thereby concentrate the heating effect of the current in the adjacent part of the electrode zone. By such means the hot zone is drawn back toward center by cooling the material in the displaced hot zone with sulphur vapors while the main current flow is withdrawn from the latter zone and concentrated in another part of the charge. Various combinations of electrodes may be made, as is readily apparent, by disconnecting one or more of them, so that any one phase may be cut out completely and the current caused to flow between the two remaining phases, or the flow through one or more phases may be reduced by cutting out one of the electrodes connected thereto. If it is desired to increase or decrease the total current flowing through any phase, the taps or contacts on the corresponding primary transformer coil may be varied accordingly so as to raise or lower the induced voltage on the secondary coil.

With a combination of six electrodes, connected either in pairs or alternately, a high degree of flexibility is attainable, although the operation may be controlled in similar fashion but to a somewhat lesser degree with only one electrode for each phase. Likewise by employing more than two electrodes for each phase, or by employing more phases, a somewhat greater degree of flexibility may be had. Other arrangements of electrodes than the one shown may also be employed to obtain substantially the same result. For instance, the electrodes need not be disposed horizontally, but may be inserted laterally in an inclined position, as shown in Fig. 4. Again, it is not necessary that all of the electrodes be in the same plane, and they may be placed at different levels, either in a superposed relation, as shown in Fig. 5, or in staggered relation, or in any equivalent lateral disposition, either horizontal or inclined. In any case, however, a more immediately effective control of the reaction and stabilization of the hot zone is secured by combining the selective control of the direction and intensity of current flow made possible by one of the electrode arrangements shown with a similar selective control of the admission of sulphur vapors at different points within the charge.

As already noted, there is a tendency of the hot zone to shift vertically within the furnace charge as well as laterally. In other words, such zone under certain conditions may rise or be caused to rise to a level above that of the electrodes. I have found it advantageous to direct the operation of the furnace positively to bring this condition about and so to stabilize the hot zone both centrally with respect to the side walls and at an elevated position with respect to the electrodes. In order to effect the vertical displacement of the reaction zone the furnace controls are operated to produce temporarily in the region contiguous to the electrodes a higher temperature than that required for normal operation, for example, to increase the same from about a cherry red to a light red or orange, as observed through the sight holes. This may be done by increasing the voltage on the electrodes by changing the taps on the primary coils of the transformer, or by decreasing the rate of supply of sulphur vapor, or by a combination of both.

When the temperature of the hot zone is thus raised, the zone extends upwardly further and further until the upper part reaches a level well above that of the electrodes. Thereupon the controls are operated in a reverse manner to reduce the voltage to a normal operating figure or to increase the supply of sulphur vapor, or both. Either procedure has the effect of cooling the charge in the immediate vicinity of the electrodes, since the temperature in the direct path of the current depends upon the strength of the current modified to a certain extent by the volume of cooler sulphur vapors introduced.

thereto. I have found, however, that the temperature of the upper part of the reaction zone, when extended as described above, is much less sensitive to changes of current flow or of volume of sulphur vapors admitted, in other words, when the temperature of the charge adjacent to the electrodes is lowered in the manner just referred to, any lowering of the temperature of the upper part of the hot zone lags considerably behind and the difference in rate of change is sufficiently great that, by arresting the cooling action on the charge near the electrodes before the upper part of the zone begins to cool off, the latter may be maintained at the existing temperature without undergoing any material change whatever. This is due to the fact that the reaction between carbon and sulphur vapor is exothermic in character, and by creating conditions where the heat losses from the process by conduction through the electrodes are less the reaction may be sustained in a zone elevated above the plane of the electrodes with a lower current consumption than when the electrodes project directly into the reaction zone. This has the added advantage that the electrodes are less rapidly attacked and consumed and may be continued in service for much longer periods. Operating in this way the portion of the charge in the direct path between the electrodes becomes simply a preheating zone for the sulphur vapors which are introduced into the furnace at a temperature between about 450° and 500° C. and must be heated up to about 600° or 700° C. before reaction thereof with carbon occurs at an appreciable rate.

When the process is conducted in the manner just described there is a gradual accumulation of ash from the charcoal consumed which forms a bed or layer between the reaction zone and the electrodes and sulphur vapor inlets tending to obstruct the flow of sulphur vapors and to insulate the reaction zone from the source of external heat supply. Such ash may conveniently be removed at intervals as required by increasing the current or reducing the supply of sulphur vapors for a time so that the temperature of the charge will be raised sufficiently to melt the ash which runs down and collects on the hearth of the furnace as a molten slag and may be tapped off through slag outlet 20. When the ash has been removed, the current is reduced to the normal figure and operation is resumed in the usual way. Naturally, if some slag forms during regular operation, it will accumulate in the lower part of the furnace and may be removed as often as necessary.

To summarize, my invention comprises an improved electric furnace of the shaft type for the manufacture of carbon bisulphide which includes a plurality of electrodes laterally inserted through the furnace wall, means for selectively connecting or disconnecting such electrodes individually in the electric power supply system serving the furnace or for increasing or decreasing the voltage impressed thereon, a principal inlet for sulphur vapor located centrally within the furnace below the electrodes, a plurality of secondary sulphur vapor inlet ports in the furnace walls below the electrodes, a common header for such inlets, valve means for regulating each inlet independently of the other inlets, and means for supplying sulphur vapor to said header. Auxiliary thereto are provided means for melting sulphur and supplying the liquid to said vaporizing means, and control means for regulating the supply of sulphur by the temperature of the sulphur vapors delivered to said header.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In an electric furnace for the manufacture of carbon bisulphide, the combination of a chamber to contain a body of carbon material, a plurailty of electrodes laterally inserted in the lower part of said chamber, a source of electrical supply to said electrodes, switch means for disconnecting each electrode independently, a plurality of sulphur vapor inlets below said electrodes, a source of sulphur vapor supply and valve means for independently controlling each of said inlets.

2. In an electric furnace for the manufacture of carbon bisulphide, the combination of a chamber to contain a body of carbon material, a plurality of electrodes laterally inserted in the lower part of said chamber, a source of electrical supply to said electrodes, switch means for disconnecting each electrode independently, a plurality of sulphur vapor inlets below said electrodes, a common header connecting said inlets with a source of sulphur vapor supply and valve means for independently controlling each of said inlets.

3. In an electric furnace for the manufacture of carbon bisulphide, the combination of a chamber to contain a body of carbon material, three or multiple thereof electrodes laterally inserted in the lower part of said chamber, a three-phase source of electrical supply, transformer means comprising primary and secondary coils, connections from the terminals of said secondary coils to each of said electrodes, switch means for disconnecting each electrode independently, a plurality of sulphur vapor inlets below said electrodes, a common header connecting said inlets with a source of sulphur vapor supply and valve means for independently controlling each of said inlets.

4. In an electric furnace for the manufacture of carbon bisulphide, the combination of a chamber to contain a body of carbon material, three or multiple thereof electrodes laterally inserted in the lower part of said chamber, a three-phase source of electrical supply, transformer means comprising primary and secondary coils, electrical connections between said supply source and said primary coils including adjustable contacts for varying the number of windings of said primary coils connected in circuit, other electrical connections from the terminals of said secondary coils to each of said electrodes, switch means for disconnecting each electrode independently, a plurality of sulphur vapor inlets below said electrodes, a common header connecting said inlets with a source of sulphur vapor supply and valve means for independently controlling each of said inlets.

5. In an electric furnace for the manufacture of carbon bisulphide, the combination of a chamber in the form of a shaft to contain a body of carbon material, three or a multiple thereof horizontal radially disposed electrodes in the lower part of said chamber, a three-phase source of electrical supply, transformer means comprising primary and secondary coils, connections from the terminals of said secondary coils to each of said electrodes, switch means for disconnecting each electrode independently, a plurality of sulphur vapor inlets below said electrodes, a common header connecting said inlets with a source of sulphur vapor supply and valve means for independently controlling each of said inlets.

6. In an electric furnace for the manufacture of carbon bisulphide, the combination of a chamber in the form of a shaft to contain a body of carbon material, three or a multiple thereof horizontal radially disposed electrodes in the lower part of said chamber, a three-phase source of electrical supply, transformer means comprising primary and secondary coils, electrical connections between said supply source and said primary coils including adjustable contacts for varying the number of windings of said primary coils connected in circuit, other electrical connections from the terminals of said secondary coils to each of said electrodes, switch means for disconnecting each electrode independently, a plurality of sulphur vapor inlets below said electrodes, a common header connecting said inlets with a source of sulphur vapor supply and valve means for independently controlling each of said inlets.

7. In an electric furnace for the manufacture of carbon bisulphide, the combination of a chamber in the form of a shaft to contain a body of carbon material, three or a multiple thereof horizontal radially disposed electrodes in the lower part of said chamber, a three-phase source of electrical supply, transformer means comprising primary and secondary coils, electrical connections between said supply source and said primary coils including adjustable contacts for varying the number of windings of said primary coils connected in circuit, other electrical connections from the terminals of said secondary coils to each of said electrodes, switch means for disconnecting each electrode independently, a principal inlet for sulphur vapor centrally disposed below the plane of said electrodes, a plurality of secondary sulphur vapor inlets in the wall of said chamber below said electrodes, a common header connecting said inlets with a source of sulphur vapor supply and valve means for independently controlling said inlets.

8. In an electric furnace for the manufacture of carbon bisulphide, the combination of a chamber in the form of a shaft to contain a body of carbon material, three or a multiple thereof horizontal radially disposed electrodes in the lower part of said chamber, a three-phase source of electrical supply, transformer means comprising primary and secondary coils, electrical connections between said supply source and said primary coils including adjustable contacts for varying the number of windings of said primary coils connected in circuit, other electrical connections from the terminals of said secondary coils to each of said electrodes, switch means for disconnecting each electrode independently, a principal inlet for sulphur vapor centrally disposed in said chamber below the plane of said electrodes, a plurality of secondary inlets in the wall of said chamber below said electrodes, a common header for said inlets, valve means for independently controlling each inlet, a source of sulphur vapor supply, a conduit connecting the latter to said header, means in said conduit to indicate the temperature of sulphur vapor therein and means responsive to such temperature indication to control the rate of supply of said sulphur, 9. In an electric furnace for the manufacture of carbon bisulphide, the combination of a chamber to contain a body of carbon material, a plurality of electrodes laterally inserted in the lower part of said chamber, a source of electric current for said electrodes, switch means for controlling each electrode independently, a source of sulphur vapor supply, a plurality of inlets adjacent to said electrodes for introducing sulphur vapor into said chamber, and valve means for independently controlling each of said inlets.

Signed by me this 6 day of October, 1930.
CLARENCE C. SCHWEGLER.